J. C. EUBANK & C. P. BARNETT.
VEHICLE WHEEL.
APPLICATION FILED JUNE 5, 1911.
1,040,178.
Patented Oct. 1, 1912.
3 SHEETS—SHEET 2.
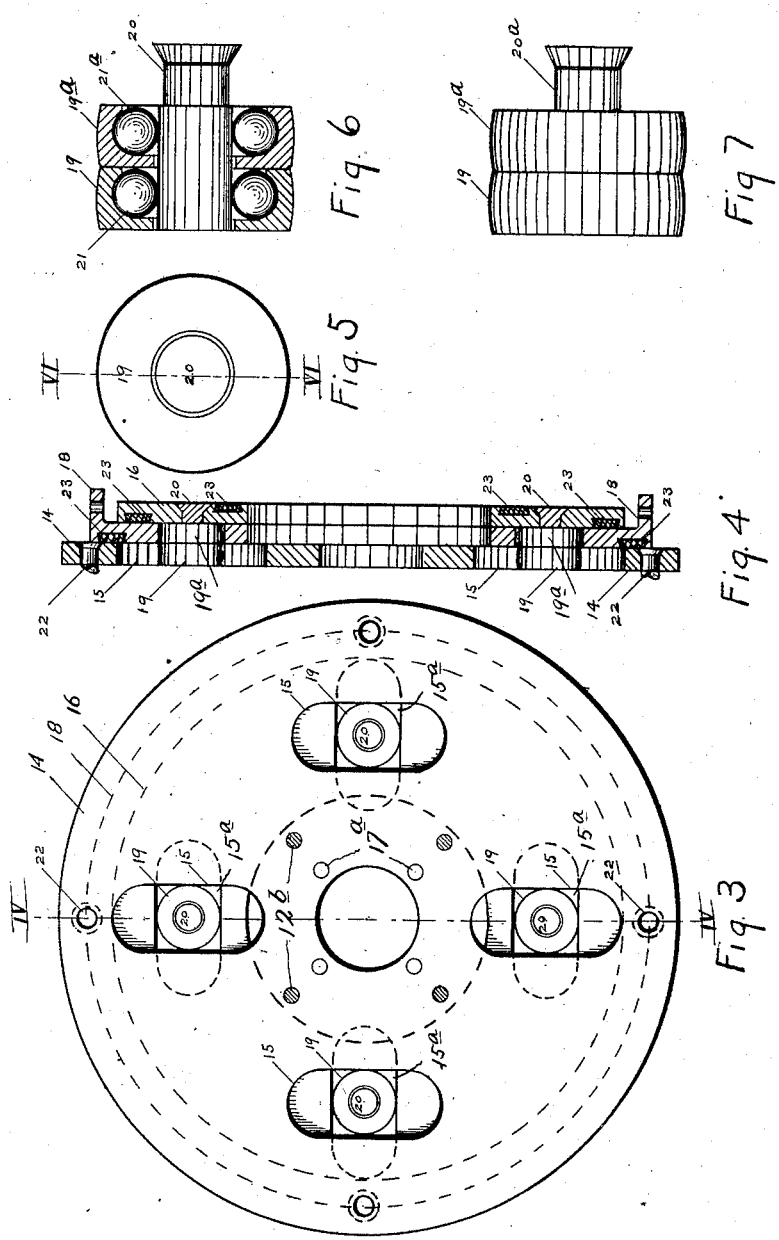

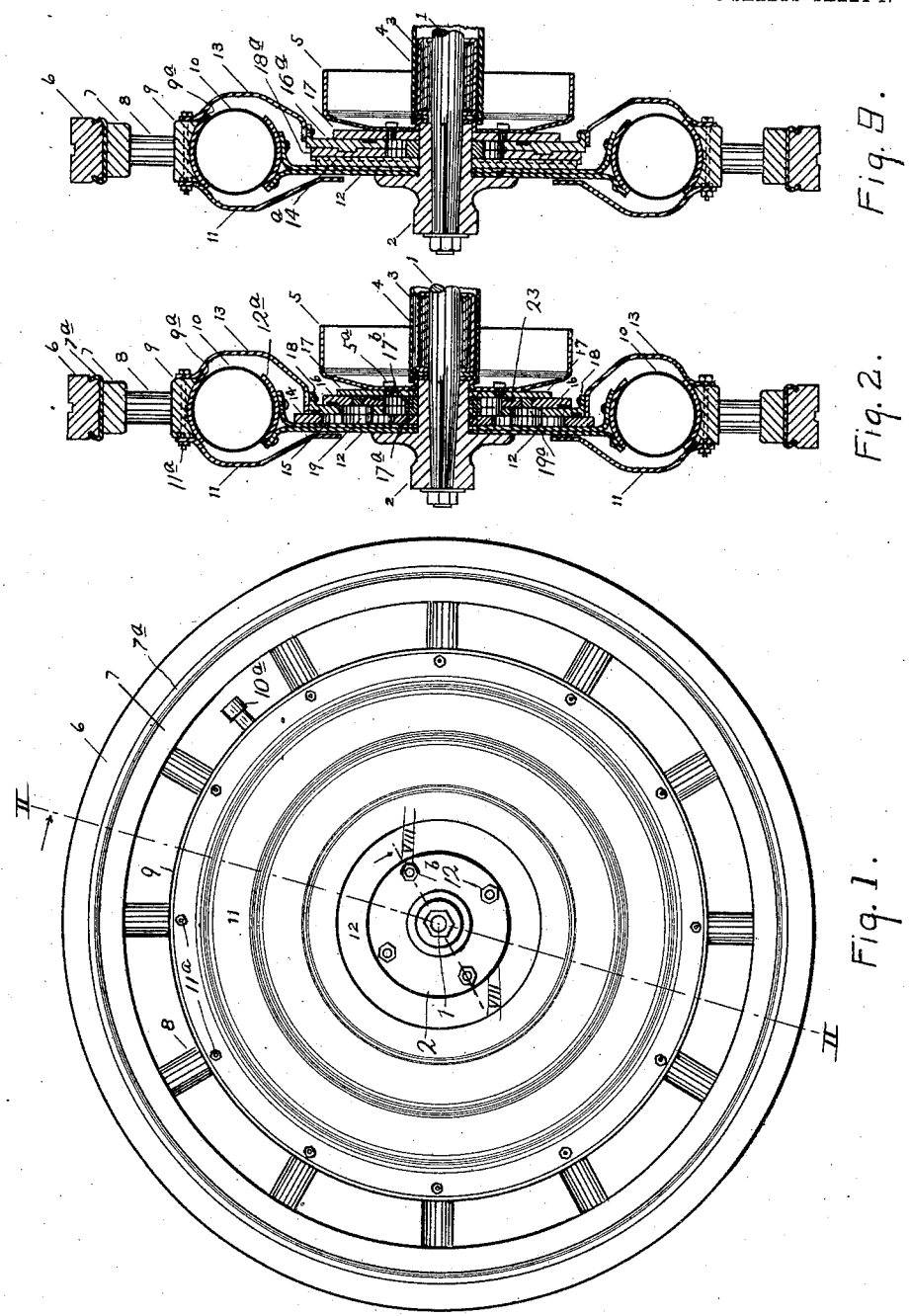

J. C. EUBANK & C. P. BARNETT.
VEHICLE WHEEL.
APPLICATION FILED JUNE 5, 1911.
1,040,178.
Patented Oct. 1, 1912.
3 SHEETS—SHEET 3.
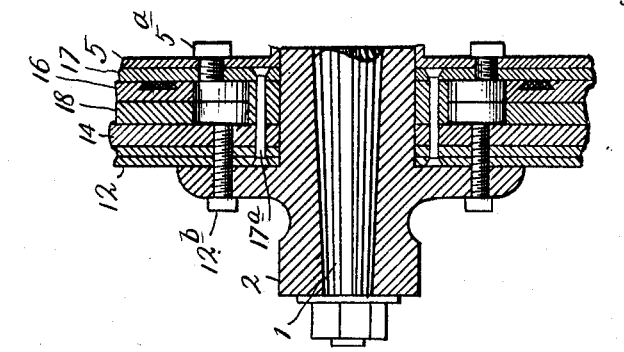
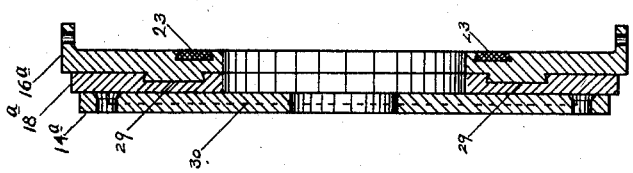
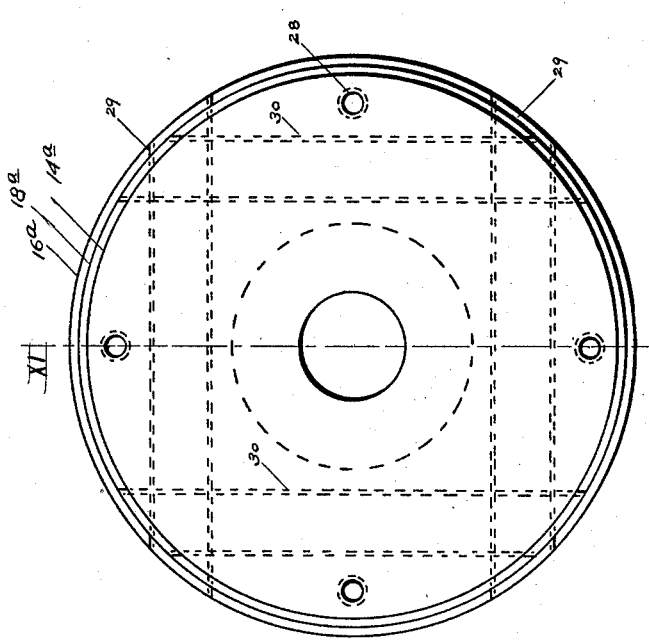
Witnesses
Walter C. Riggin.
E. C. Lillian.
Inventors:
J.C.Eubank and C.P.Barnett,
By F. G. Fischer, atty.

UNITED STATES PATENT OFFICE.

JUDSON C. EUBANK AND CARL P. BARNETT, OF KANSAS CITY, MISSOURI.

VEHICLE-WHEEL.

1,040,178.  Specification of Letters Patent.  Patented Oct. 1, 1912.

Application filed June 5, 1911. Serial No. 631,319.

*To all whom it may concern:*

Be it known that we, JUDSON C. EUBANK and CARL P. BARNETT, citizens of the United States, residing at Kansas City, in the county of Jackson and State of Missouri, have invented certain new and useful Improvements in Vehicle-Wheels, of which the following is a specification.

Our invention relates to improvements in vehicle wheels, and our object is to provide a pneumatic cushioned wheel of simple, durable, and efficient construction especially adapted for use upon automobiles in which the pneumatic tube, while free to efficiently cushion the wheel and vehicle supported thereby, is protected from puncture, in which the pneumatic tube may be readily removed and replaced, and in which the wheel can be run without injury to said tube, although the same should be deflated.

A further object of the invention is to provide a novel clutch to coöperate with our improved wheel in propelling the vehicle, said clutch being in positive operation at all times, whether the wheel be running forward or backward, and thus relieving the pneumatic tube of all driving strain to which it would otherwise be subjected.

Other objects of the invention will hereinafter be pointed out, and in order that said invention may be fully understood, reference will now be made to the accompanying drawings, in which:

Figure 1 shows a side elevation of our improved wheel. Fig. 2 is a section on line II—II of Fig. 1. Fig. 3 is an enlarged detail side elevation of the clutch forming an important feature of the invention. Fig. 4 is a vertical cross section on line IV—IV of Fig. 3. Fig. 5 is a side elevation of a pair of antifrictional rollers forming part of the clutch. Fig. 6 is a vertical cross section on line VI—VI of Fig. 5. Fig. 7 is a front elevation of the antifriction rollers. Fig. 8 is a detail section on line VIII—VIII of Fig. 1. Fig. 9 is a vertical cross section of a modified form of our improved wheel. Fig. 10 is a detail side elevation of the clutch, embodied in the modified form of wheel. Fig. 11 is a vertical cross section on line XI—XI of Fig. 10.

Referring particularly to the preferred form disclosed by Figs. 1 to 8, inclusive, of the drawings, 1 designates a driven axle keyed to hub 2 of the wheel, and journaled in the customary antifriction bearings, each of which comprises rollers 3, and a casing 4.

5 designates the customary brake-drum for checking the wheel.

6 designates the tire, which may consist of rubber, rawhide, composition, or other suitable material, and is secured to rim 7 by a flanged ring 7$^a$.

8 designates the spokes, which are secured to rim 7 and a spoke-ring 9 carrying at its inner side a concave seat 9$^a$, for the outer periphery of pneumatic tube 10, the inner side of which is supported by a concave seat 12$^a$, secured to a disk 12, fixedly-secured to hub 2 and the adjacent member 14 of the drive-clutch, by cap-screws 12$^b$. Clutch-member 14, is further secured to disk 12 by a plurality of rivets 22. Pneumatic tube 10 is provided with the customary valve 10$^a$, through which it may be inflated or deflated.

11 designates a convex annular shield to protect the adjacent side of the pneumatic tube from injury, said shield being removably-secured to the spoke-rim 9, by a plurality of bolts 11$^a$, and slidably-engaging the adjacent side of disk 12, so that it may move independently thereof to allow compression of the pneumatic tube when the wheel passes over an obstruction.

13 designates a convex annular shield to protect the other side of the pneumatic tube 10, and rigidly connect the spoke-rim 9 to the intermediate clutch-member 18. Clutch-member 18 is interposed between the two outer clutch-members 14 and 16, which have central openings, so that they may move longitudinally-independently of clutch-member 14, without contacting with a spacing-sleeve 17$^b$, hereinafter referred to. To permit of the longitudinal movement, just referred to, clutch-member 14 has a plurality of equally-spaced slots 15, (Figs. 3 and 4) in which one set of antifriction rollers 19 are adapted to travel, said rollers being mounted upon antifriction balls 21, carried by stub-shafts 20 projecting laterally from clutch-member 16 to which they are riveted. In order that clutch-member 18 may at times move longitudinally-independently of clutch-member 16, said clutch-member 18 is provided with slots 15ª extending transversely to slots 15, and in which are arranged a plurality of antifriction rollers 19ª, mounted upon antifriction balls 21ª carried by the stub-shafts 20.

The clutch-members are held from lateral displacement by disk 12, and a disk 17, and packing rings 23 are interposed between the clutch-members and between clutch-member 16 and disk 17, to retain a lubricant to reduce the wear incident to the longitudinal movement of the clutch-members. Disk 17 is firmly secured to disk 12 by rivets 17ª, which pass through the spacing-sleeve 17ᵇ surrounding hub 2 and interposed between clutch-member 14 and disk 17 to reinforce the same and prevent the clutch-members from being drawn too tightly together by the rivets 17ª. Disk 17 and brake-drum 5 are firmly secured together by cap-screws 5ª.

In practice the clutch constitutes a yielding medium between hub 2 and tire 6, so that when said tire strikes an obstruction it may pass upward over the same and transmit the shock incident thereto to the pneumatic tube 10 instead of to the hub and the vehicle. Although the clutch is free to yield and permit compression of tube 10 when the wheel passes over an obstruction, said clutch is always in positive engagement whether the wheel be running forward or backward and thus relieves said tube of all driving strain. For instance, when slots 15 are in the vertical position shown in Fig. 3, clutch-members 16 and 18 are free to move vertically-independently of clutch-member 14, but at the same time are driven by said clutch-member 14—the clutch-member 16 being driven through the intermediacy of the sides of the uppermost and lowermost slots 15, and the uppermost and lowermost rollers 19—while clutch-member 18 is driven through the intermediacy of the sides of the two intermediate slots 15ª and the two engaging rollers 19ª. When the wheel revolves a quarter of a revolution and thus brings slots 15ª to vertical position, the intermediate clutch-member 18 is free to move vertically-independently of its companion clutch-members, and is driven through the intermediacy of the sides of the, then uppermost and lowermost, slots 15ª and the two engaging rollers 19ª. When the slots 15 and 15ª are brought to an oblique position through the rotation of the wheel, clutch-members 16 and 18 are both free to move vertically-independently of the clutch-member 14. From the foregoing it will be understood that the intermediate clutch-member 18, which is rigidly-connected to tire 6 through the intermediate parts, is free to move vertically with said tire when passing over an obstruction without moving the clutch-member 14, which is rigidly connected to the hub 2 through the intermediacy of disk 12 and the cap-screws 5ª. Should a hole occur in the pneumatic tube 10 and permit the same to become deflated, the clutch will properly perform its function of propelling the wheel without transmitting any strain to the pneumatic tube, the latter, however, can be readily removed for repairs when deflated by taking off the shield 11. The distance between disks 12 and 17 equals the width of the standard spoke, hence in substituting our improved wheel for a standard wheel, the hub and brake mechanism of the latter can be retained, thus materially reducing the cost of equipping an automobile with our improved wheels.

Our modified form of wheels shown by Figs. 9 to 11, inclusive, is substantially identical in construction and operation as the preferred form, except that the slots 15 and 15ª, the antifriction rollers 19 and 19ª, and the stub-shafts 20 are dispensed with—the clutch-members 14ª, 18ª and 16ª, being operatively connected by dove-tailed tongues 29 and 30 on members 16ª and 18ª respectively, slidingly-arranged in corresponding grooves in members 14ª and 18ª. This construction further differs from the preferred form in that the outer clutch-member 16ª is secured to shield 13, instead of the intermediate clutch-member, as in the preferred form.

Having thus described our invention what we claim and desire to secure by Letters Patent, is:

1. In combination with a hub and rim and a pneumatic tube therebetween, a clutch consisting of three elements, one of said elements being rigidly connected to the hub, another of said elements being rigidly connected to the rim, and the third of said elements being located between the first two, two of said elements having elongated slots, the slots of one of said last named elements being disposed at right angles to the slots of the other of said last named elements, and a stub shaft carried by the third element and having a pair of antifriction rollers thereon arranged in side by side relation that engage in each of the respective adjacent slots of said slotted elements.

2. In combination with a hub, a disk mounted on the hub, and formed with a peripheral seat, a pneumatic tire in said seat, a ring encircling the tire, a clutch member mounted on the hub and abutting said disk, means to rigidly connect the disk and clutch member to the hub, an intermediate clutch member mounted on the hub, a third clutch member mounted on the hub and engaging the intermediate clutch member, said third and intermediate clutch members having movable connections that are at right angles to each other, an annular shield connected to one side of the ring and extending partly over said disk, a second annular shield connected to the opposite side of the ring and rigidly connected to the intermediate clutch member, and a tire carried by said ring.

In testimony whereof we affix our signatures, in the presence of two witnesses.

JUDSON C. EUBANK.
CARL P. BARNETT.

Witnesses:
WALTER C. RIGGIN,
F. G. FISCHER.

Copies of this patent may be obtained for five cents each, by addressing the "Commissioner of Patents, Washington, D. C."